C. EBERHART, Jr.
REGISTER AND INDICATOR FOR AUTOMOBILE GASOLENE TANKS.
APPLICATION FILED JUNE 14, 1913.
1,242,664.
Patented Oct. 9, 1917.
6 SHEETS—SHEET 1.
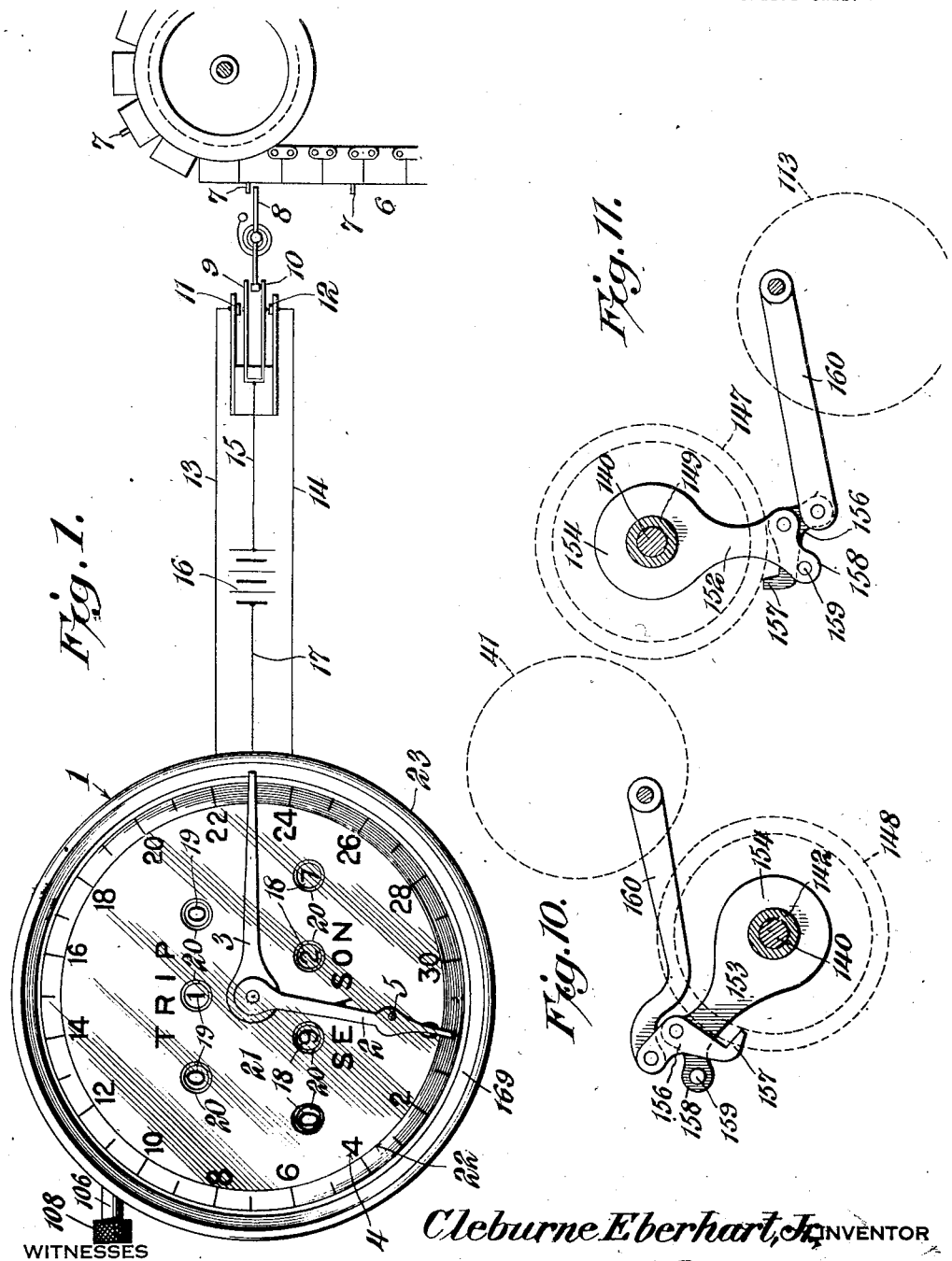
Cleburne Eberhart, Jr. INVENTOR
WITNESSES
Howard D. Orr.
F. T. Chapman.
BY
E. G. Siggers
ATTORNEY

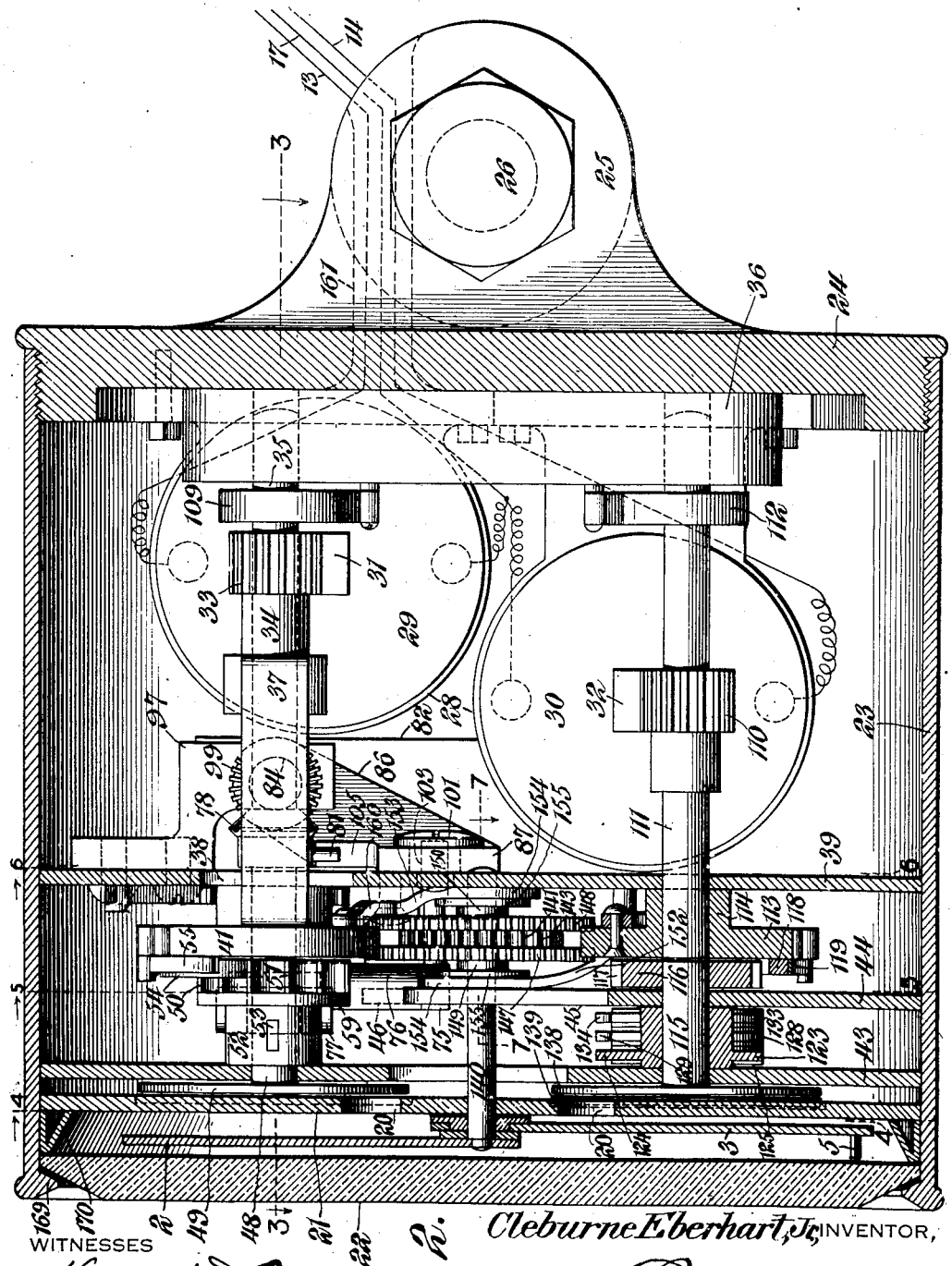

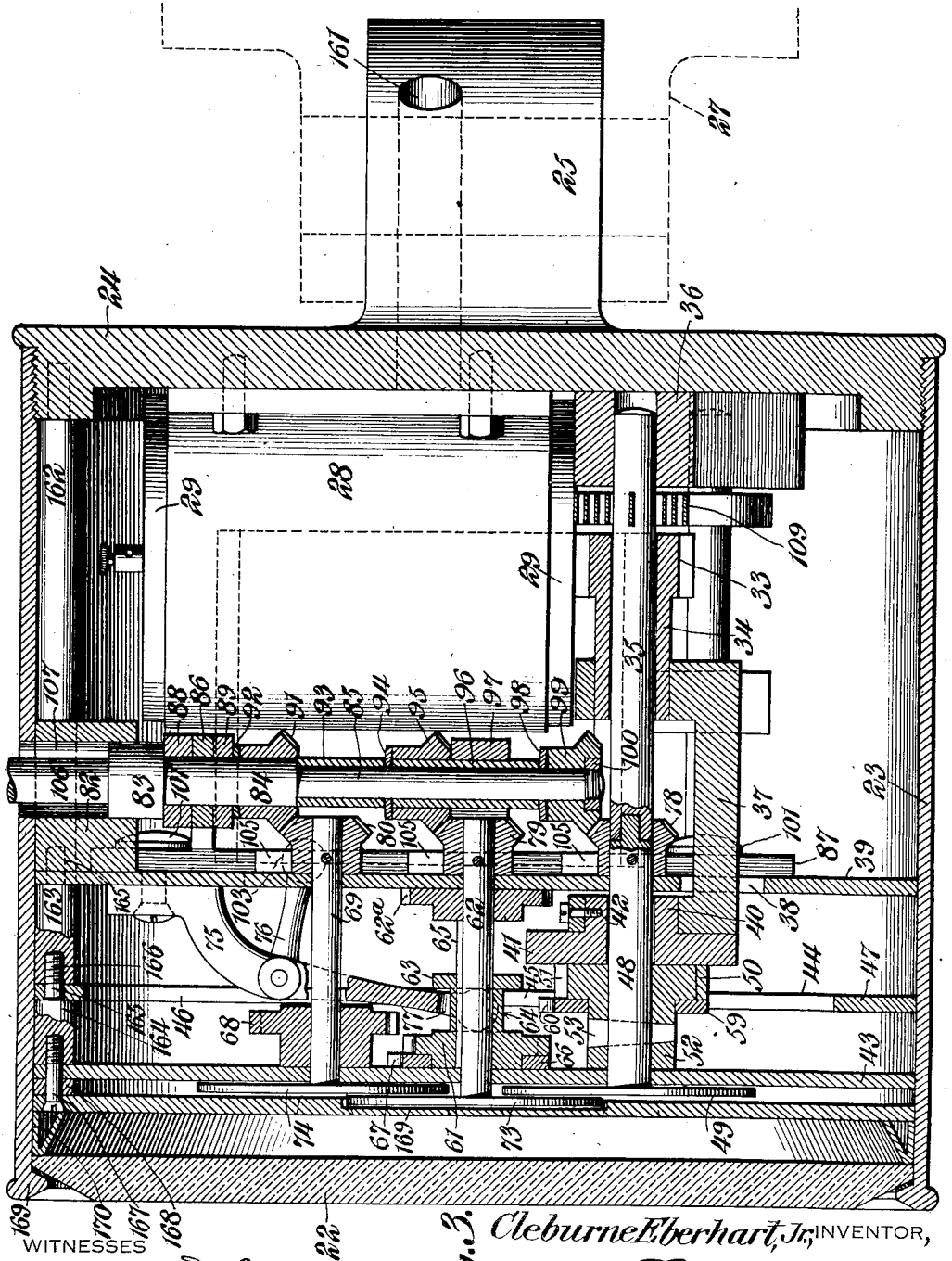

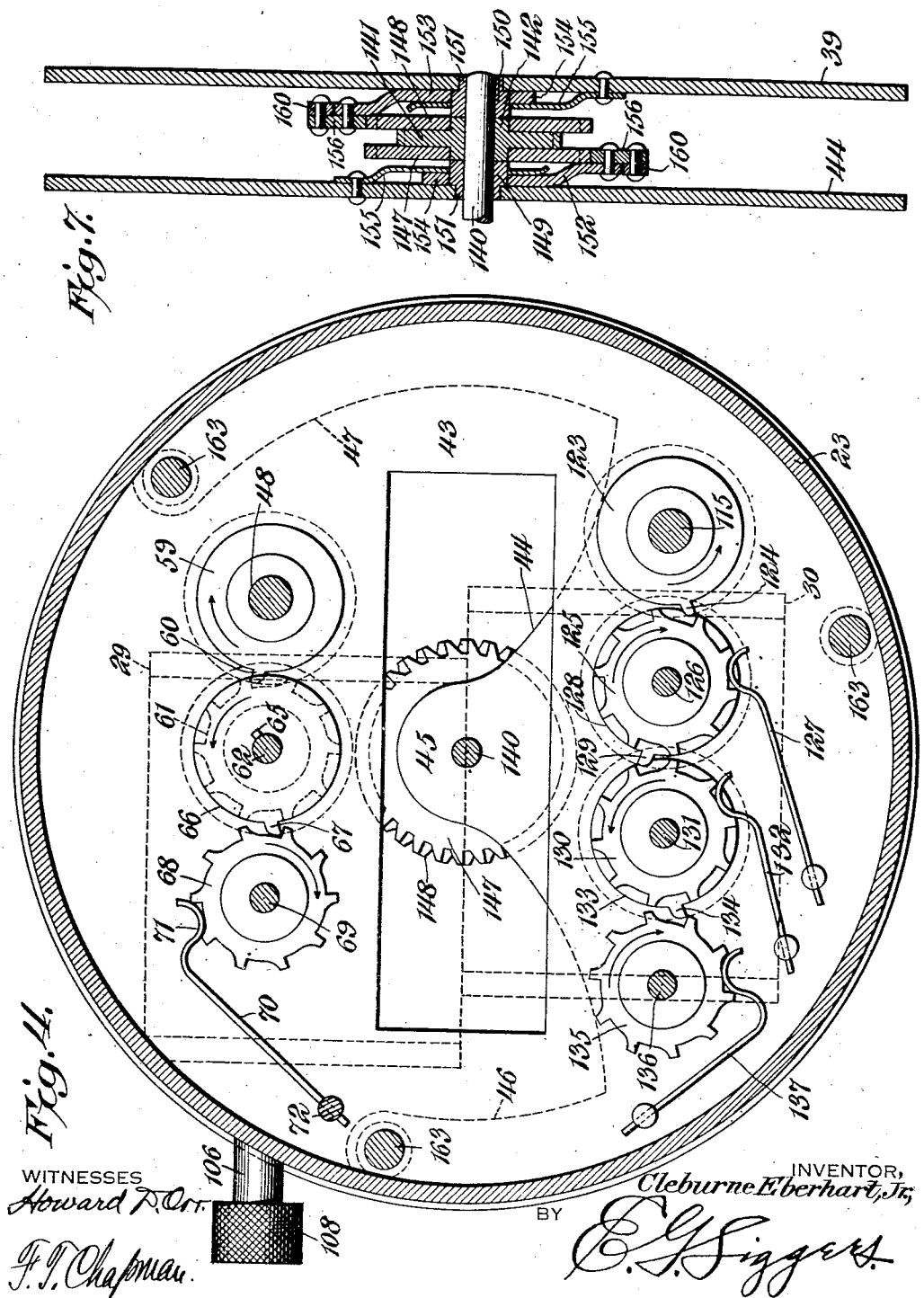

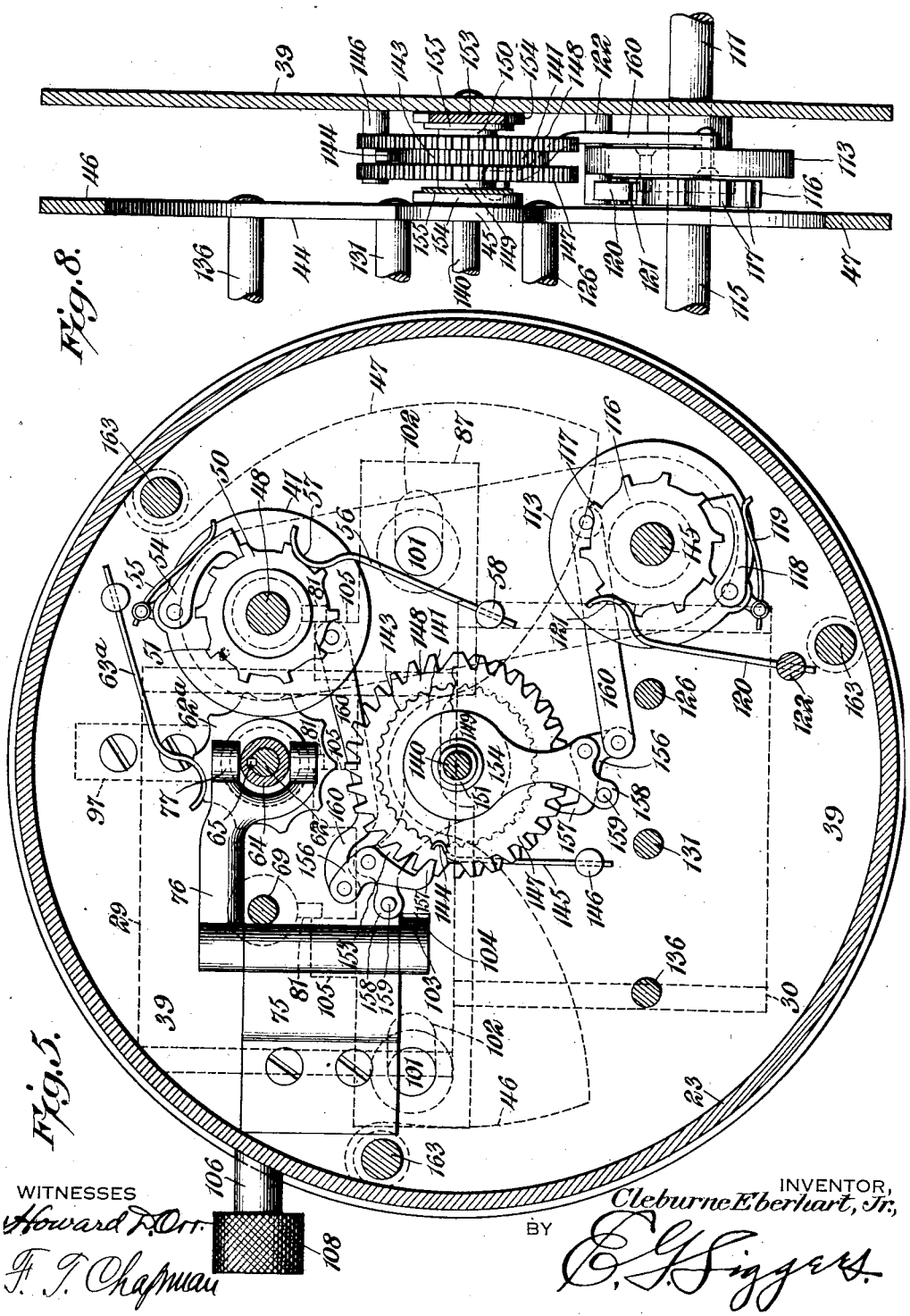

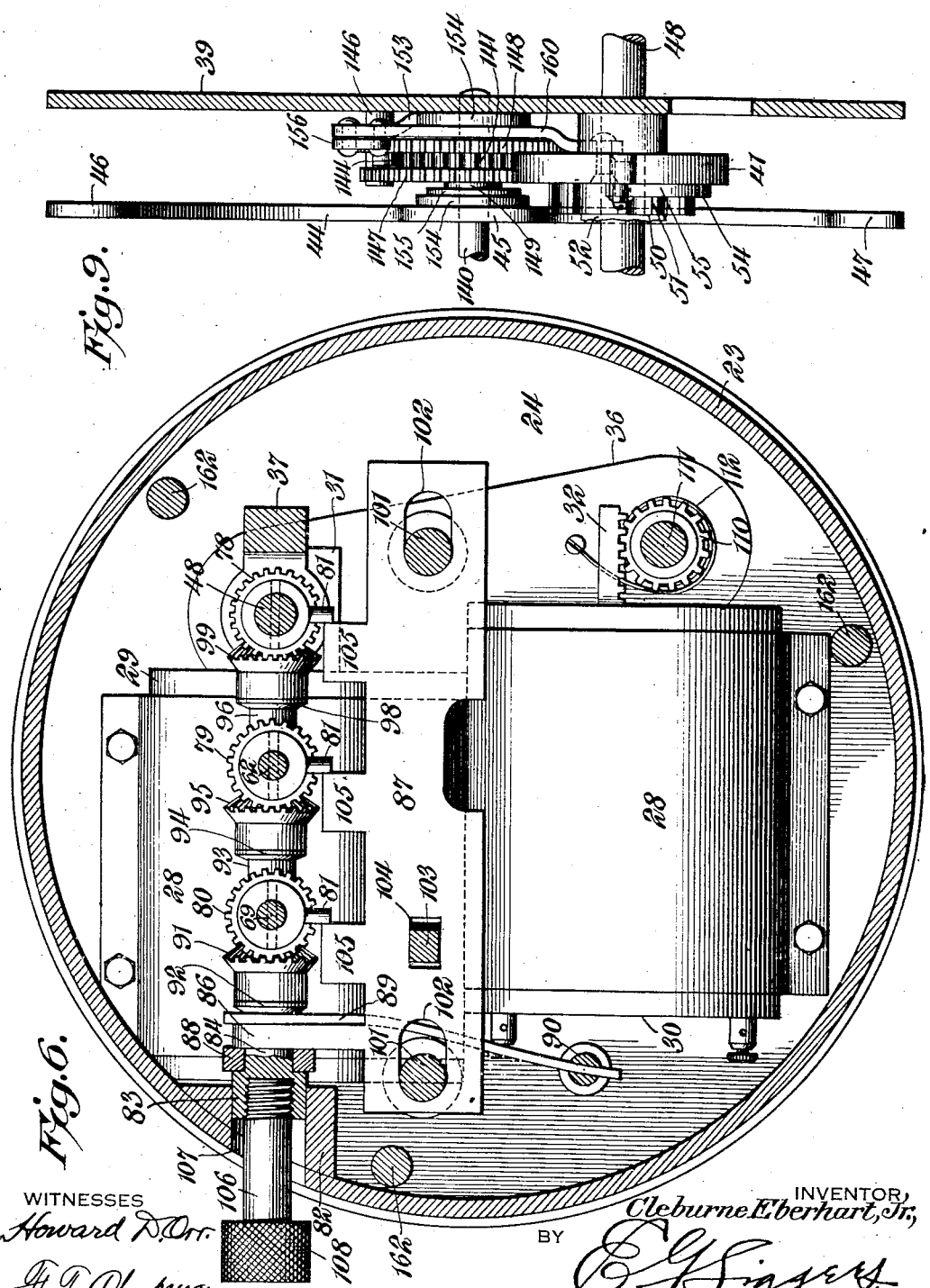

UNITED STATES PATENT OFFICE.

CLEBURNE EBERHART, JR., OF ATLANTA, GEORGIA.

REGISTER AND INDICATOR FOR AUTOMOBILE GASOLENE-TANKS.

1,242,664.  Specification of Letters Patent.  Patented Oct. 9, 1917.

Application filed June 14, 1913. Serial No. 773,722.

*To all whom it may concern:*

Be it known that I, CLEBURNE EBERHART, Jr., a citizen of the United States, residing at Atlanta, in the county of Fulton and State of Georgia, have invented a new and useful Register and Indicator for Automobile Gasolene-Tanks, of which the following is a specification.

This invention has reference to improvements in registers and indicators for gasolene tanks of automobiles, and is designed to provide a visible indicator showing at all times the amount of gasolene within the tank and also producing a trip and season registration of the amounts of gasolene used.

While the prime purpose of the present invention has to do with gasolene tanks of automobiles, the structure is adaptable to other uses where the registration and indication may have nothing to do with gasolene, but with other fluids or conditions, and consequently while for the purposes of simplicity of description gasolene will be considered as the fluid employed and the gasolene tank of an automobile as the receptacle for the fluid, it is to be understood that the invention is by no means confined to such particular use and the terms gasolene and gasolene tank of an automobile whether employed in the description or claims is to be interpreted broadly enough to include any other devices or materials to which this invention may be applicable.

Ordinarily automobiles are provided with gasolene tanks of considerable capacity, sometimes as high as twenty-five or thirty gallons, and sometimes as low as ten gallons or less, but they are not customarily equipped with any means for showing the amount of gasolene in the tank, or any means whereby the user of the automobile can ascertain except with difficulty, the amount of gasolene which may have been used during a certain period of time or on a trip, while there is no practical means at all provided for registering the amount of gasolene which may be used during a long period of time, such as a season.

The present invention contemplates means which may be so arranged as to be at all times within ready observation of the operator of the automobile, whereby the capacity of the tank is indicated, the amount of gasolene which may at any time be within the tank is indicated, the amount of gasolene used within any short period, such as during a trip is registered, and the amount of gasolene which may be used within any long period of time, such as a season, is registered, and all these operations are entirely automatic, except that it is necessary to reset the trip register at the beginning of each trip.

In accordance with the present invention a small instrument which may correspond in size and appearance to the familiar speedometer employed upon automobiles, may be attached to the dash board in such position as to be as readily visible as is the speedometer. The face of the device displays a dial having numbers which may indicate quantities of gasolene, usually by one gallon steps, up to a quantity representing the capacity of the largest vehicle to which the device may be attached. The face of the instrument also displays numbers, as the gasolene is used, representing the amount per trip and the amount per season. Moreover, the device displays two hands, one of which is movable by the other, and the second hand is responsive to the depth of gasolene within the tank. The first hand is designed as a permanent indicating hand, and the second hand will, when the tank is initially filled to its capacity, move the first hand to a point on the dial showing that capacity whatever it may be, and this hand remains in the fixed position indefinitely. The second hand, being responsive to changing levels of gasolene within the tank, plays over the dial in accordance with whether the tank is being filled or the gasolene is being used. If, after the initial filling of the tank the gasolene is used, the responsive hand moves backward over the dial toward the zero position, thus indicating at all times the available amount of gasolene within the tank. When the tank is replenished this hand moves away from the zero position toward the full position indicated by the fixed hand. The indicator provides a ready means whereby the owner of the vehicle may ascertain at any time by observation how much gasolene is put into the tank and if then purchasing the gasolene need pay for only so much as the indicator may denote. On observing the amount of gasolene in the tank, as indicated at the beginning of a trip on the dial and then the amount indicated at the end of the trip, provided it be a relatively short trip, the difference will indicate the amount of gasolene used without having recourse to the trip register which may be employed for longer trips during which it may be necessary to replenish the tank several times. The season register is designed to indicate larger amounts, so that the running expenses for, say, a year, so far as fuel is concerned, may be readily ascertained by noting the amount of gasolene used during such period of time.

The particular instrumentalities which may be employed will be better understood from a consideration of the following detailed description taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—

Figure 1 is a face view of the indicating and registering instrument of the present invention and showing more or less diagrammatically the connections and structures whereby the instrument is operated.

Fig. 2 is a central front to rear section of the casing with most of the interior parts shown in side elevation, but with a portion of the season register shown in section.

Fig. 3 is a section on the line 3—3 of Fig. 2.

Fig. 4 is a section on the line 4—4 of Fig. 2.

Fig. 5 is a section on the line 5—5 of Fig. 2.

Fig. 6 is a section on the line 6—6 of Fig. 2.

Fig. 7 is a detail section on the line 7—7 of Fig. 2.

Fig. 8 is a fragmentary plan view with some parts shown in section of certain structures indicated in Fig. 5.

Fig. 9 is a plan view with some parts in section similar to Fig. 8 and showing some higher parts illustrated in Fig. 5.

Figs. 10 and 11 are views of operating pawls for the hand indicating the amount of gasolene in the tank.

Referring first to Fig. 1 of the drawings, there is shown a register and indicator 1 having two hands 2 and 3, respectively, and an index 4 over which both hands may sweep, the index being designed to represent units of measurement of the contents of a tank or reservoir, and as the invention is designed more particularly for indicating the contents of the gasolene tank of an automobile, the index may represent gallons of gasolene. Since for manufacturing reasons it is advisable to have a single index suited for automobiles of different sizes, the extent of the index may be initially such as to show the contents of the largest gasolene tank employed in automobiles, and for this and other reasons the hand 3 is provided, which hand is under the control of the hand 2, the latter carrying a pin 5 arranged to engage the hand 3 and propel it from an initial zero position to some other position which may designate the full capacity of the gasolene tank. In the particular showing of Fig. 1 the largest tank provided for may be considered as of thirty gallons capacity, while the particular tank of the automobile upon which the device is assumed to be installed has a capacity of twenty-three gallons, as indicated by the hand 3, which, when the device is installed, is supposed to rest at the zero indication with the hand 2, and as the gasolene tank is filled to its capacity the hand 2 travels over the face of the index plate of the indicator until the indication 23 is reached, the hand 3 participating in this movement, but being so mounted that it will remain in the position to which it has been moved under all conditions of use, wherefore the hand 3 may be considered as a fixed hand, while the hand 2 is a movable hand showing variations in the contents of the gasolene tank from zero to the full capacity.

To cause movements of the hand 2 the tank may be provided with any appropriate float mechanism controlling a flexible member or chain 6 having pins 7 thereon properly spaced to indicate units of capacity of the tank, say, gallons, and these pins have in their path a pivoted arm or lever 8 movable into engagement with either one of two oppositely movable spring contact fingers 9, 10, respectively, arranged to engage electric contacts 11, 12, respectively forming the terminals of conductors 13, 14, respectively, while the fingers 9 and 10 have a common connection 15 with a battery 16 or other source of electric current, and the battery 16 is connected to a conductor 17 on the side remote from the conductor 15 in a manner to be hereinafter described. Within the casing 1 is appropriate mechanism actuated by the electric current supplied by the battery 16, which may be taken as typical of any source of current, as the circuit supplied by this battery is closed by the controller represented by the contact devices 9 to 12, inclusive. As gasolene is poured into the tank the float will rise and the chain 6 is caused to travel in a manner to bring successive pins 7 into engagement with the lever 8, whereupon a succession of impulses is caused through the indicator and register in a manner to produce a step by step movement of the hand 2 until the full capacity of the tank has been reached or a certain lesser amount of gasolene has been introduced into the tank. By appropriate mechanism to be described, the movement of the hand 2, which under the circumstances mentioned may be clockwise, is registered, and this registration is shown by indicator numerals 18 which are changed only when gasolene is introduced into the tank. As gasolene is used, the float will drop and the pins 7 will rock the lever 8 in a direction to cause a retrograde movement of the hand 2, this movement being ordinarily counterclockwise, so as to travel reversely along the indications of the indicator plate from a high number toward zero, and this movement is indicated by the display of numbers 19, the numbers 18 and 19 being visible through sight openings 20 in a front plate 21 of the indicator and register 1, which front plate contains the index numbers 4 and may be covered by a glass plate 22 as is customary, said glass plate being held in a casing 23 which may follow the usual practice in structures of this character.

The electric controller and float responsive means for actuating the same do not in themselves form any part of the present invention, being shown more in detail and also described and claimed in application No. 768,832, for indicator operating devices for gasolene tanks, filed by me on May the 20th, 1913.

Coming now to the construction of the indicator and register 1, the casing 23 is shown as a cylinder provided with a head 24 at the end remote from the glass plate 22, and this head may be threaded and the corresponding end of the casing 23 also threaded, so that the parts may be screwed together. At the outer rear face of the head 24 there is formed a lug or boss 25 designed to receive a bolt 26 by means of which the structure may be made fast to a bracket, such as indicated in dotted lines at 27 on Fig. 3, and which in turn may be made fast to the dash of the automobile within ready observation distance of the operator of the vehicle.

Within the casing and made fast to the head 24 by straps 28 or otherwise, are two electromagnets 29, 30, respectively, one side of each of which is connected to the conductor 17 and the other sides of these magnets are connected to the conductors 13 and 14, respectively.

While it is immaterial for the purpose of the present invention what type of electromagnets be used, it is preferred to utilize solenoids, and each solenoid has its core terminating in a rack bar 31, 32, respectively. The rack bar 31 is in mesh with a pinion 33 provided with an elongated hub 34 and mounted on a shaft 35 having bearings at one end in a block 36 fast to the inner wall of the head 24. Fast to the extended hub 34 of the pinion 33 is an arch bracket 37 participating in movements of the pinion 33 under the action of the rack 31. This arch bracket extends through an opening 38 in a plate 39 disposed laterally of the casing and of about the same diameter and serving as a support for certain mechanisms. The end of the bracket 37 remote from the hub of the pinion 33 receives a hub portion 40 of a disk 41 mounted on the shaft 35, the shaft having a bearing in the plate 39 adjacent to the hub 40. The bracket 37 may be made fast to the hub of the disk 41 by a set screw 42, or in any other appropriate manner.

The plate 39 is arranged at some little distance back of the face or index plate 21, and between these two plates are other plates 43 and 44, respectively, in spaced relation one to the other and to the plates 21 and 39. The plate 44, however, is incomplete circumferentially, forming but a segment of a complete circle, and having a central portion 45 in the longitudinal axis of the casing and terminal extensions 46, 47, respectively, to which reference will hereinafter be made.

The front end of the shaft 35 may be axially recessed to form a bearing for one end of a stub shaft 48, the other end of which extends through and has a bearing in the plate 43, and between said plate and the face plate 21 the shaft 48 carries a disk 49 upon which one set of the numerals 19 may be placed and the numerals on the particular disk 49 may represent the units of the indicator train of numerals shown through the sight openings 20 designed to display those numerals of the parts moved when the hand 2 is actuated in the reverse or backward direction, and which numbers indicate the number of gallons of gasolene used during a certain period which may be a relatively short period, and is consequently designated by the word "trip" in Fig. 1 of the drawings, the numerals 18 being designed to indicate a total amount of gasolene used during a long period of time, and hence designated in Fig. 1, by the word "season."

The stub shaft 48 has mounted thereon a ratchet wheel 50 having spaced teeth 51 about its periphery, this wheel being provided with an axially extended hub 52 through which and the corresponding portion of the shaft 48 there may be passed a key 53, as representative of any suitable means of permanently fastening the ratchet wheel 50 to the stub shaft 48. The disk 41 carries a pawl 54 in position to engage the teeth 51 and urged toward the ratchet wheel 50 by a spring 55. The ratchet wheel 50 is prevented from overrunning by a detent spring 56 having one end 57 shaped to engage between adjacent ratchet teeth and the other end fast in a post 58 in turn fast upon the plate 39.

Secured to the ratchet wheel 50 is a toothed disk 59 best shown in Fig. 4 and provided with a single tooth 60. Normally in the path of the tooth 60 is a star wheel 61 mounted on a shaft 62 having bearings in the plates 43 and 39 and extending through both, the star wheel 61 having an extended hub 63 with an intermediate circular groove or channel 64, and is mounted upon the shaft 62 to slide longitudinally thereon, but is constrained to rotate with the shaft by means of an elongated spline 65. The shaft 62 is prevented from overrunning by a notched disk 62ª and detent spring 63ª adapted thereto. The star wheel 61 carries a disk 66 having a single peripheral tooth 67 designed to engage the teeth of a star wheel 68 mounted on a shaft 69, which like the shaft 62 is journaled in the plates 39 and 43, and is secured to the shaft to rotate therewith. The star wheel 68 is held against overrunning by a detent spring 70 having a free end 71 shaped to lodge between the teeth of the star wheel, while the other end is mounted in a post 72 which may be made fast to the plate 43. The toothed disk 59, star wheel 61, toothed disk 66 and star wheel 68 constitute an indicator train, while the shafts 62 and 69 carry number disks 73 and 74, respectively, with numbers visible through the sight openings 20 of the trip indicator, the numbers on the disk 73 representing tens and those on the disk 74 representing hundreds.

Mounted on the plate 39 and projecting toward the plate 43 is a bracket 75 in which is pivoted a bell crank lever 76 having one arm terminating in a fork 77 straddling the hub 63 in the groove 64, the arrangement being such that on the rocking of the lever 76 the intermediate star wheel 61 may be moved lengthwise of the shaft 62 into and out of operative relation to the toothed disk 59 and star wheel 68.

The shafts 48, 62 and 69 all extend through the plate 39 and on the side thereof toward the head 24 carry respective bevel pinions 78, 79 and 80 each made fast to its shaft and each pinion has fast thereto a radially projecting pin 81. The plate 39 adjacent to the casing 33 has fast thereto a block 82 in which is lodged a collar 83 on one end of a shaft 84 having a reduced extension 85. The shorter portion of the shaft 84 extends through an arm 86 projecting from a slide plate 87, and between this arm and the collar 83 there is introduced a washer 88, while bearing upon the arm 86 on the side thereof remote from the washer 88 is one end of a spring 89 which may be a leaf spring, the other end of which is supported in a post 90 fast to the plate 39. The shorter portion of the shaft 84 carries a bevel pinion 91 which may be moved into and out of mesh with the bevel pinion 80, the shaft being capable of longitudinal movement in its bearing. The pinion 91 is held to the shaft 84 by a spring washer 92 interposed between one end of the pinion 91 and the spring 89. The other end of the pinion 91 bears against a sleeve 93 on the reduced portion 85 of the shaft and the other end of this sleeve bears against the spring washer 94 in turn in engagement with one end of a bevel pinion 95 movable into and out of mesh with the bevel pinion 79, and this pinion 95 is mounted on a sleeve 96 carried by the reduced portion 85 of the shaft 84. The sleeve 96 has a bearing in a bracket 97 carried by the plate 39 and serves to support the reduced portion 85 of the shaft 84. The sleeve 96 at the end remote from the washer 94 bears against a spring washer 98 in turn engaging one end of a bevel pinion 99 movable into and out of mesh with the bevel pinion 78, while a nut 100 applied to the corresponding end of the reduced portion 85 of the shaft 84 serves to maintain the pinion 99 on the shaft.

The slide plate 87 is held to the plate 39 by headed studs 101 extending through elongated slots 102 near the ends of the plate, while the angle or bell crank lever 76 has an end portion 103 entered into a slot 104 in the plate to be moved thereby. The plate 87 has the edge carrying the arm 86 formed with lugs or projections 105 movable into and out of the path of the pins 81.

The collar 83 has secured thereto a stem 106 either by having the stem threaded and screwed into the collar or in any other appropriate manner, and this stem is of a length to extend to the exterior of the casing 23 through a passage 107 provided in the casing and exterior to the casing has a milled head 108 or any other appropriate means for permitting the rotation of the stem 106 and with it the shaft 84 by the hand of an operator. The tendency of the spring 89 is to maintain the shaft 84 with the bevel pinions on the shaft out of mesh with the bevel pinions 78, 79 and 80, respectively, and in this position of the parts the plate 87 is moved correspondingly so that the lugs 105 are out of the paths of the pins 81. Under these circumstances the indicator disks 49, 73 and 74 may be moved under the action of the shaft 35, the normal position of the angle lever 76 being such as to hold the star wheel 61 in the path of the teeth 60 and the tooth 67 in position to engage the teeth of the star wheel 68. Under these circumstances indication is made of the number of gallons of gasolene used out of the tank. As the indicator just referred to is the trip indicator it is desirable to reset it to the zero position at the end of each trip or other relatively short period of time. To do this the operator grasps the milled head 108 and by pushing the shaft 84 against the action of the spring 89 the gear wheels 91, 95 and 99 are brought into mesh with the gear wheels 80, 79 and 78, respectively. At the same time the lever 76 is rocked so as to carry the star wheel 61 and its toothed disk 66 out of the path of the other members of the train and the plate 87 is moved so that the lugs 105 are in the paths of the pins 81. Now on rotating the milled head 108 while it is still pressed inwardly, rotative movement is imparted to the shafts 48, 62 and 69 all in the same direction and this rotative movement continues until the pins 81 come in contact with the lugs 105, at which position the zero indications on the number disks 49, 73 and 74 are coincident with the sight openings 20 on the trip indicator. Whether or not the pins 81 all engage the lugs 105 at the same time is immaterial, for as soon as a pin 81 engages a lug 105 rotative movement of the pinion carried by the shaft 84 ceases, since such pinion will then remain at rest, while the shaft continues to rotate because it is connected to the shaft only through the spring washer 92, 94 or 98, respectively. After the indicating numbers have been all brought to the zero position the head 108 may be released, whereupon the spring 89 will move the shaft 84 lengthwise in a direction to carry the pinions on the shaft away from the pinions in the indicator shafts and return the plate 87 to its first position with the lugs 105 out of the paths of the pins 81 and the star wheel 61 and toothed disk carried thereby into operative relation to the rest of the train ready to again indicate use of gasolene.

The shaft 35 has secured thereto one end of a spiral spring 109, the other end of which is made fast to some fixed portion of the structure, as, for instance, the block 36, and this spring is put under tension by the rotative movement of the shaft 35 when the solenoid becomes active and when the solenoid is deënergized the spring 109 turns the shaft to its first position ready for subsequent actuation, and this movement causes a corresponding movement of the bracket 37 and disk 41 returning the pawl 54 to its first position ready to engage the next tooth 51 in order on the ratchet wheel 50, the detent spring 56 preventing any movement of the ratchet wheel 50 on the retreating movement of the pawl 54. In this way the ratchet wheel 50 is given a step by step forward movement resulting in a like actuation of the indicating disks.

The solenoid 30 has its rack 32 in mesh with a pinion 110 on a shaft 111 mounted at one end in a block 36 similar to the mounting of the shaft 35, while the other end of the shaft 111 has a bearing in the plate 39. The shaft 111, like the shaft 35, is under the control of a spiral spring 112 fast at one end to the shaft and at the other end to the block 36, so that at each energization of the magnet 30 resulting in the indrawing of the rack 32 the rotative movement imparted thereby to the shaft 111 winds up the spring 112 to a commensurate extent, and when the solenoid is deënergized the parts are returned to their first position by the reaction of the spring 112. The shaft 111 terminates between the plates 39 and 44 and there carries a disk 113 provided with a hub 114 offsetting the disk a short distance from the plate 39. In alinement with the shaft 111 and mounted in the plates 43 and 44 is a stub shaft 115 carrying adjacent to the disk 113 a ratchet wheel 116 best shown in Fig. 5 and similar to the ratchet wheel 50 except that in the particular construction shown it is provided with teeth 117 reversely arranged with respect to the arrangement of the teeth 51 on the ratchet wheel 50. The disk 113 carries a pawl 118 urged toward the ratchet wheel 116 by a spring 119, so as to engage a tooth 117. There is also provided a detent spring 120 having a free end 121 shaped to engage between the teeth 117 to prevent overrunning of the ratchet wheel while the other end of the spring is made fast to a post 122 which may be carried by the plate 44.

The shaft 115 between the plates 43 and 44 carries a toothed disk 123 having a single peripheral tooth 124 in position to engage a star wheel 125 mounted on a pin or arbor 126 and held against overrunning by a spring 127 engaging the teeth of the star wheel, and this star wheel has fast thereto a disk 128 with a single peripheral tooth 129 in position to engage the teeth of a star wheel 130 mounted on an arbor 131 between the plates 43 and 44 and in turn provided with a detent spring 132. The star wheel 130 is provided with a disk 133 having a peripheral tooth 134 in position to engage a star wheel 135 also mounted between the plates 43 and 44 on an arbor 136, and this last-named star wheel is held against overrunning by a detent spring 137. The shaft 115 extends through a plate 43 and between this plate and the front plate 21 carries a number disk 138, and the arbors 126, 131 and 136 are also extended through the plate 21 and provided with number disks, one of which is indicated at 139 in Fig. 2. These disks carry the numbers 18 which are visible through sight openings 20 in the face plate 21 similar to the arrangement of the sight openings 20 through which the numbers on the disks 49, 73 and 74 are visible. The number disks controlled by the last described indicator train represent the season use of gasolene, and, therefore, need no resetting mechanism, although such an arrangement is not precluded, but is usually unnecessary.

The hand 2 is mounted upon an arbor 140 extending through the face plate 21 and having journal bearings in the part 45 of the plate 44 and also in the plate 39, the arbor 140 being in the longitudinal axis of of the casing, the latter being usually cylindrical.

Mounted on the arbor 140 between the plates 39 and 44 is a disk 141 having an axially extended hub 142 and provided with a peripheral series of notches 143, the latter being relatively shallow and designed to receive the end 144 of a detent spring 145, the other end of the spring being carried by a post 146 fast on the plate 39.

Mounted on the hub 142 on opposite sides of the disk 141 are two ratchet wheels 147 and 148, respectively, each having a number of teeth corresponding to the divisions of the plate or dial 21 and the teeth of one ratchet wheel are oppositely disposed with reference to those of the other ratchet wheel.

Mounted on the arbor 140 between the plates 39 and 44 and on opposite sides of the hub 142 are bushings 149 and 150 and each having a reduced portion 151 extending through the respective plate. These bushings may serve as bearings for the arbor 140 and mounted on the bushings 149 and 150 are rock arms 152 and 153, respectively. These rock arms have portions 154 immediately surrounding the bushings broadened so as to bear against the respective plates 44 and 39 and are held in frictional engagement with these plates by respective springs 155 each fast at one end to a plate 39 or 44, as the case may be, and at the other end bear against that face of the enlargement 154 remote from the respective plate to which the spring is attached, the springs being shown as leaf springs. By this means the rock arms may be maintained in their relative positions and still be quite thin. Each rock arm carries a pawl 156 shown as an angle pawl with a nose 157 shaped to engage between the teeth of the respective ratchet wheel 147 or 148, as the case may be. Each arm 152 and 153 is provided with a lug extension 158 carrying a pin 159 in the path of the respective pawl 156 limiting the movement of the latter away from the teeth of the respective ratchet wheel. The angle end of each pawl 156 remote from its nose 157 is connected by a link 160 to the respective disk 41 or 113, as the case may be, the construction being such that when the disk 41 or 113, as the case may be, is rocked, the corresponding pawl 156 is first rocked until its nose 157 is moved into position between two teeth of the corresponding ratchet wheel 147 or 148 and the continued movement of the disk 41 or 113 causes a corresponding movement of the ratchet wheel. The parts are proportioned so that a movement of the disk 41 a distance corresponding to the distance between two adjacent teeth 51 will result in a movement of the ratchet wheel 147 a distance which will rotate the arbor 140 sufficiently to move the hand 2 in the counterclockwise direction corresponding to the space between two unit divisions of the dial 21. A like movement of the disk 113 will cause a movement of the ratchet wheel 148 sufficiently to move the hand 2 in a clockwise direction a unit division upon the dial 21. When the respective disk 41 or 113 is rocked in the inactive position, that is, in a direction to carry the pawl 54 or 118 from an engaged tooth into position to engage the next succeeding tooth, the respective pawl 156 is first rocked upon its pivot connection with the arm 152 or 153 until brought into engagement with the pin 159, this movement being sufficient to carry the nose 157 out of engagement with the teeth of the respective ratchet wheel, whereupon a further movement of the disk 41 or 113 causes a rocking of the arm 152 or 153 sufficiently to bring the pawl into position to be moved into active relation to the next following tooth in order of the respective ratchet wheel, so that when the respective disk 41 or 113 is again actively moved, the nose 157 of the corresponding pawl is first moved into position between two successive teeth and then the corresponding ratchet wheel is actuated in the manner already described.

To prevent tampering of the electrical conductors they may be in armored form known in the trade as BX cable. Such a compound conductor is carried through a passage 161 in the boss 25 on the head 24 and any system of wiring may be employed which will prevent access to the conductors.

To properly space and hold the plates 21, 39, 43 and 44 any suitable supports therefor may be provided. For instance, rods or pins 162 are shown in the drawings as made fast at one end to the inner wall of the head 24 just within the casing 23, and these rods extend to the plate 39. In alinement with the rods 162 are spacers 163 between the plate 39 and the plate 44. Between the plate 44 and the plate 43 are other spacers 164 and each spacer 163 and 164 has a stem continuation 165 extending through the respective plates 39 and 44 and threaded into the spacers 163 or rods 162, as the case may be, as indicated at 166, thus clamping the respective plates between them. The dial plate 21 is secured to the plate 43 in spaced relation thereto by screws 167 and spacing washers 168, while the dial plate may be recessed, as indicated at 169, to accommodate the disk 73 on the trip registering mechanism.

By the construction described the parts may be all readily assembled, after which the casing 23 is secured to the head 24 and at the end remote from the head 24 the casing is formed with a peripheral bead 169 to hold the glass front 22 in place, the latter being spaced from the dial plate 21 by a ring 170, as is customary.

Assuming that the indicator and register is installed upon an automobile with the gasolene tank empty, and the hands 2 and 3 at the zero position, and with the circuit connections all properly arranged, then as gasolene is poured into the tank, the pins 7 are caused to move successively into engagement with the arm or lever 8 and a corresponding succession of energizations of the magnet 30 follows. At each energization of the magnet 30 the shaft 111 has a partial rotation imparted thereto and each time the magnet or solenoid 30 is deënergized the shaft 111 is rocked in the other direction to its first position by the spring 112. Each rocking movement of the shaft 111 causes a corresponding rocking movement of the disk 113 and this movement is transmitted through the link 116 to the pawl 156 and rock arm 152, thus resulting in a clockwise movement of the arbor 140 and a corresponding movement of the hand 2 which in turn carries the hand 3 with it. Under the assumption that the first filling of the tank is to its capacity, each unit of quantity of gasolene, which may be assumed as a gallon, which is poured into the tank causes a forward step movement of the hands 2 and 3. In the particular indication of Fig. 1 it is assumed that the tank has already been filled and that the hand 3 has been moved to the position indicating the full capacity of the tank which may be taken as twenty-three gallons, this being simply an arbitrary assumption. Suppose, now, that the automobile is being used. Under these conditions the direction of movement of the pins 7 is the reverse of that first assumed, since as the gasoline is used up the level within the tank lowers, and now the conditions are such that the solenoid 29 is energized instead of the solenoid 30. This results in successive rockings of the disk 41 and successive step by step movements of the ratchet wheel 148, thus turning the arbor 40 in a counterclockwise direction resulting in the movement of the hand 2 toward the zero position to an extent corresponding to the amount of gasolene used by gallons.

Every time that gasolene is introduced into the tank the level of liquid therein is raised and the solenoid 30 is energized, and not only is the hand 2 moved in a direction to indicate increments of gasolene, but the registry train indicating the total amount of gasolene which may have been introduced into the tank from time to time during a season or other long period, is actuated.

The reverse or counterclockwise movement of the hand 2 due to the lowering level of gasolene represents decrements of gasolene and this also causes the movements of the registry train indicating the amount of gasolene which may be used for any desired short period of time, such as during a trip, and provision is made for resetting the trip registry mechanism at any time the operator may desire.

The hand 3 is rendered inaccessible by being behind the glass cover 22 and when once positioned will retain its place indefinitely, thus showing to the owner or operator of the vehicle the capacity of the tank and serving as a check upon any person filling the tank from purposely charging for more gasolene than was actually introduced thereinto. If the hand 2 shows that the tank is empty, then it is known that no more than twenty-three gallons of gasolene can be placed in the tank. If the hand 2 shows that the tank contains some amount of gasolene less than twenty-three gallons, then if gasolene be placed in the tank until the hand 2 coincides with the hand 3, it is known that the difference between the first indication of the hand 2 and the final position of the hand, whether it reaches the twenty-three mark or not represents the amount of gasolene actually introduced into the tank.

Since the structure may be installed with all parts under seal except the resetting head or knob 108, the season register will serve as a check against dishonest chauffeur or garage owners or attendants inclined to present bills for larger amounts of gasolene than actually furnished or used.

Whatever be the amount of gasolene introduced into the tank from time to time the amounts so introduced are added to the indication on the season register, while the amount or amounts used out are indicated on the trip register and the amount used on a trip may represent several complete or partial fillings of the tank or the trip register may be reset at such frequent intervals that a single filling of the tank will be sufficient for several trips. The trip register also provides means for ascertaining quite accurately the consumption of gasolene by the automobile so that the efficiency of the power mechanism of the vehicle may be gaged quite accurately.

What is claimed is:—

1. An indicator and register provided with a dial, a hand or pointer movable in opposite directions over the dial, means for moving the hand over the dial in a direction to indicate increasing amounts, other means for moving the hand over the dial in the opposite direction to that caused by the first-named means, and registering mechanism responsive solely to the second-named hand-moving means.

2. An indicator and register provided with a dial having indicia thereon in increasing progressive order, a hand or pointer associated with the dial and movable in opposite directions thereover, means for advancing the hand step by step over the dial in a direction to indicate increasing amounts, other means for moving the hand step by step over the dial in the opposite direction to the first-named movement, and registering mechanism responsive solely to said second-named hand-moving means.

3. An indicator and register provided with a dial, a hand or pointer associated with the dial and movable in opposite directions thereover, means for positively advancing the hand over the dial to indicate increasing amounts, means of like construction to the first-named means for moving the hand in the reverse direction to that first-named, and registering mechanism connected solely to the second-named means for actuation thereby.

4. An indicator and register provided with two registering means, indicating means and actuating means for moving the indicating means in respectively opposite directions, and separate connections between the actuating means for the indicator means and the respective registering means for actuating one or the other of said registering means in accordance with the direction of movement of the indicating means.

5. In a structure for indicating and registering increases and decreases in a condition, means responsive to such increases and decreases of the condition, an indicator movable in opposite directions, means controlled by the first-named means on an increase in the condition to be indicated for moving the indicator in one direction, means controlled by the first-named means on a decrease in the condition to be indicated for moving the indicator in the opposite direction, and a register connected to and actuated by the last-named means.

6. In a structure for indicating and registering increases and decreases in a condition, means responsive to such increases and decreases of the condition, an indicator movable in opposite directions, means controlled by the first-named means on an increase in the condition to be indicated for moving the indicator in one direction, means controlled by the first-named means on a decrease in the condition to be indicated for moving the indicator in the opposite direction, and separate registers connected respectively to the different means for actuating the indicator and separately actuated thereby.

7. An indicator and register provided with indicating means movable in opposite directions, two oppositely acting actuating means for the indicator, one connected to move the indicator in one direction and the other in the opposite direction, and separate registering means connected independently to respective actuating means for the indicating means.

8. An indicator and register provided with movable indicating means, means for actuating the indicating means progressively, means for actuating the indicating means retrogressively, and registering means responsive solely to the means for actuating the indicating means retrogressively.

9. An indicator and register provided with movable indicating means, means for actuating the indicating means progressively, registering means responsive to the means for actuating the indicating means progressively, means for actuating the indicating means retrogressively, and registering means responsive to the means for actuating the indicating means retrogressively.

10. An indicating and registering system for the gasolene tanks of automobiles comprising means responsive to rise and fall of gasolene level, an electric circuit controller responsive to said means, electromagnets coupled up with the electric circuit controller for separate energization in accordance with the rise and fall of gasolene level, reciprocatory mechanism individual and responsive to each magnet, a register individual to and responsive to each reciprocatory mechanism, a dial, a hand movable over the dial, means responsive to the reciprocatory mechanism of one magnet to move the register connected thereto and the hand simultaneously to indicate rising level of gasolene in the tank, and means responsive to the reciprocatory mechanism of the other magnet to move the register individual thereto and the hand in a direction indicating falling level of gasolene.

11. An indicating and registering system for gasolene tanks of automobiles, comprising means responsive to rise and fall of gasolene level, separate electro-mechanical means including circuit-controlling means coupled thereto and responsive respectively to the rise and fall of the gasolene level, a register individual to and responsive to each electro-mechanical means, an indicator connected to one electro-mechanical means for actuation to indicate rising level of gasolene in the tank, and connections between the other electro-mechanical means and the indicator for causing the latter to indicate lowering level of gasolene in the tank.

12. In an indicator and register, a casing, a dial plate carried by the casing, an arbor in operative relation to the dial plate, a hand or pointer carried by the arbor and movable over the dial plate, a detent disk and ratchet wheels on the arbor, said ratchet wheels having oppositely directed teeth, means for temporarily holding the detent disk and yieldable to permit the disk to turn in either direction, rock arms carried by the arbor, a rockable pawl on each rock arm, means on each rock arm for limiting the movements of the pawl away from the respective ratchet, rock shafts, connections therefrom to the pawl carried by each rock arm, and electromagnetic means for causing rocking movements of the rock shafts.

13. In an indicator and register, a casing, a dial plate carried by the casing, an arbor in operative relation to the dial plate, a hand or pointer carried by the arbor and movable over the dial plate, a detent disk and ratchet wheels on the arbor, said ratchet wheels having oppositely directed teeth, means for temporarily holding the detent disk and yieldable to permit the disk to turn in either direction, rock arms carried by the arbor, a rockable pawl on each rock arm, means on each rock arm for limiting the movements of the pawl away from the respective ratchet, rock shafts, connections therefrom to the pawl carried by each rock arm, and electromagnetic means for causing rocking movements of the rock shafts, each rock shaft having a registering mechanism individual to and associated therewith, and connections between each rock arm and a respective registering mechanism.

14. In a combined registering and indicating mechanism, a dial, a hand movable thereover, a ratchet wheel connected to the hand for imparting a step by step movement thereto, a rock arm associated with the wheel, a pawl carried by the rock arm and movable into and out of engagement with the ratchet wheel, a rock member, means for causing rocking movements of the rock member, and a connection between the rock member and the pawl, the rock member having a greater angular movement than the rock arm to cause movements of the pawl into and out of engagement with the teeth of the ratchet wheel and to rotate the ratchet wheel.

15. In a combined registering and indicating mechanism, a dial, a hand movable thereover, a ratchet wheel connected to the hand for imparting a step by step movement thereto, a rock arm associated with the wheel, a pawl carried by the rock arm and movable into and out of engagement with the ratchet wheel, a rock member, means for causing rocking movements of the rock member, and a connection between the rock member and the pawl, the rock member having a greater angular movement than the rock arm to cause movements of the pawl into and out of engagement with the teeth of the ratchet wheel and to rotate the ratchet wheel, the rock member having a register mechanism associated therewith, and a pawl and ratchet connection between the rock member and register mechanism, and constructed to respond to the greater angular movement of the rock member.

16. In an indicator and register, a dial plate, a hand movable thereover, an arbor carrying the hand, a ratchet wheel fast to the arbor, a rock arm carried by the arbor, a pawl carried by the rock arm, a stop member for the pawl on the rock arm, a rock shaft, a connection between the rock shaft and the pawl for causing rocking movements of the pawl on the rock arm and rocking movements of the rock arm about the arbor, a registering mechanism, a pawl and ratchet connection between the rock shaft and the registering mechanism, the rock shaft having a greater angular movement than the rock arm, arbor and hand to compensate for movements of the first named pawl into and out of engagement with the first named ratchet, and means for imparting rocking movements to the rock shaft.

17. In an indicator and register, a dial plate, a hand movable thereover, an arbor carrying the hand, a ratchet wheel fast to the arbor, a rock arm carried by the arbor, a pawl carried by the rock arm, a stop member for the pawl on the rock arm, a rock shaft, a connection between the rock shaft and the pawl for causing rocking movements of the pawl on the rock arm and rocking movements of the rock arm about the arbor, a registering mechanism, a pawl and ratchet connection between the rock shaft and the registering mechanism, the rock shaft having a greater angular movement than the rock arm, arbor and hand to compensate for movement of the first named pawl into and out of engagement with the first named ratchet, and means for imparting rocking movements to the rock shaft, said means comprising an electromagnetic mechanism for moving the rock shaft in one direction and a spring for moving the rock shaft in the other direction.

18. In an indicator, a dial plate, a hand movable thereover, an arbor carrying the hand, a ratchet wheel connected to the arbor, a rock arm movable about the axis of the arbor, and there expanded, a fixed member against which the expanded end of the rock arm engages, a spring engaging the face of the rock arm remote from the fixed member for holding it frictionally thereto, a pawl carried by the rock arm in operative relation to the ratchet wheel, and means for reciprocating the rock arm, said last named means including a rock shaft, a link connection between the rock shaft and the pawl, and a stop member for the pawl carried by the rock arm.

19. In a device for the purpose described, a rock shaft, means for imparting rocking movements thereto, a registering train including single tooth and star wheels in operative relation one to the other, a pawl and ratchet connection between the rock shaft and the unit member of the registering train, the tens member of the registry train being movable into and out of engagement with the unit member, pinions connected to each member of the registry train, a stop member movable into and out of operative relation to each pinion, and resetting means comprising a manipulating shaft, pinions frictionally mounted thereon and spaced to move simultaneously into and out of engagement with the first-named pinions, connections between the resetting mechanism and the tens member of the registry train, and accessible means for imparting rotative movement to the frictionally held pinions when in engagement with the pinions on the registry train to reset said train.

In testimony that I claim the foregoing as my own, I have hereto affixed my signature in the presence of two witnesses.

CLEBURNE EBERHART, Jr.

Witnesses:
ROLLIN N. PECK,
C. McNEW PARR.